United States Patent [19]

Magyar et al.

[11] Patent Number: 4,501,825
[45] Date of Patent: Feb. 26, 1985

[54] TIRE SEALER AND INFLATOR

[75] Inventors: Arpad M. Magyar, Conroe; Gerald G. Smith, Kingwood, both of Tex.

[73] Assignee: Pennzoil Company, Houston, Tex.

[21] Appl. No.: 625,531

[22] Filed: Jun. 28, 1984

[51] Int. Cl.³ ............................................. C08J 9/30
[52] U.S. Cl. .................................. 521/78; 152/347; 222/4; 428/912; 521/68; 521/84.1; 521/88; 521/136; 521/70; 521/71; 521/79; 521/81
[58] Field of Search ............... 523/166; 152/346, 347, 152/348; 521/78, 68, 70, 71; 524/903; 428/912; 222/4

[56] References Cited

U.S. PATENT DOCUMENTS

| | | | |
|---|---|---|---|
| 3,400,095 | 9/1968 | Kremer et al. | 524/903 |
| 3,819,119 | 6/1974 | Coffey et al. | 524/903 |
| 4,056,213 | 11/1977 | Stern | 524/903 |
| 4,101,494 | 5/1978 | Kent et al. | |
| 4,137,206 | 9/1979 | Kent | |
| 4,224,208 | 12/1980 | Kent | |
| 4,337,322 | 4/1982 | Jaspon | |
| 4,426,468 | 7/1984 | Ornum et al. | |

*Primary Examiner*—Morton Foelak
*Attorney, Agent, or Firm*—Lowe, King, Price & Becker

[57] ABSTRACT

A novel tire sealant and inflator composition comprising a resin, a latex sealant, alkylene glycol, fibers, an alkanolamine, a foaming agent, and water. The composition is packaged in aerosol cans with a chlorofluorocarbon propellant/inflator and used to seal and inflate punctured tires. The composition is applied to the punctured tire through the valve stem, and acts to seal the puncture and inflate the tire sufficiently to support the weight of the car.

20 Claims, No Drawings

TIRE SEALER AND INFLATOR

TECHNICAL FIELD

This invention relates to a novel composition useful as a tire sealant and inflator. The composition contains a resin, a sealant, a freeze point depressant, a fiber component, a corrosion inhibitor, a foaming agent, and water. The composition is useful for temporarily sealing and inflating a punctured automobile tire in combination with a propellant/inflator.

BACKGROUND OF THE INVENTION

The advantages of a portable tire repair kit have long been appreciated. A product of this type, available in the car, provides assurance that the motorist will not be required to change a flat tire on the road. Further, the driver of a car which is not equipped with a spare tire, can inflate a flat tire sufficiently to safely reach a repair facility without the inconvenience and danger of being stranded on the road or having to use road service.

A number of prior art tire sealant compositions have been described. U.S. Pat. No. 4,101,494 to Kent et al discloses a tire sealant composition containing water, ethylene glycol, polyvinyl alcohol, asbestos fibers, fiberglass fibers, a wetting agent, and a rust preventative.

U.S. Pat. Nos. 4,137,206 and 4,224,208 to Kent disclose sealant compositions containing water, ethylene glycol, amines such as lower alkylamines, lower cycloalkylamines, napthylamines, morpholines, benzothiazoles, and salts thereof, a methyl cellulose or polyvinyl alcohol component, and fiberglass or asbestos fibers.

U.S. Pat. No. 4,337,322 to Japson discloses a wheel balancing and sealant composition comprising water, ethylene glycol, polyisoprene, process oil, detergent, sodium bicarbonate, and asbestos fibers.

Ornum et al, U.S. Pat. No. 4,426,468 discloses tire sealant compositions comprising butyl rubber, polyisobutylene and/or polybutene, a resin, zinc oxide, carbon black, polystyrene, para-quinone, and benzoyl peroxide, and Japanese patent publication number 57-63374 discloses a tire sealant composition which includes water, a rust preventative, an organic polymer, and a bacterial growth inhibitor.

In order to be useful under adverse road conditions, a tire sealer and inflator composition must be sufficiently tacky and cohesive to be able to seal a puncture in a tire whether or not the puncturing object remains in the puncture hole. The composition must be able to seal a puncture in any position on the tire when applied through the tire's valve stem. Further, the seal must withstand the internal pressure of the tire, as well as the pressure exerted on the tire by the weight of the car.

The present invention provides a new tire sealer composition which represents an improvement in such compositions and is particularly suitable for use on modern tires.

SUMMARY OF THE INVENTION

It is accordingly an object of this invention to provide a sealant composition which is capable of sealing a tire puncture with or without the puncturing object still embedded in the tire.

It is a further object of this invention to provide a sealant composition capable of withstanding the internal inflated pressure of the tire as well as the pressure exerted on the tire by the weight of the car and the friction of the road surface.

A still further object of this invention to provide a tire sealant composition capable of sealing a puncture at any location on the tire surface when the sealant is applied through the valve stem of the tire.

It is an even further object of this invention to provide a tire sealant and inflator composition which allows the tire to be inflated from substantially 0 psi to an internal pressure sufficient to support the weight of the car.

A still further object of this invention is to provide the motorist with an aerosol can of tire sealer and inflator containing no flammable propellants and thus providing him with a safety feature not found in products of this type which are usually propelled with flammable low molecular weight hydrocarbons.

Other objects and advantages of the invention will become apparent as the description thereof proceeds.

In satisfaction of the foregong objects, the present invention provides a tire sealant and inflator composition comprising the following components combined with a propellant/inflator:

| Component | Wt. % - Amount |
|---|---|
| (a) a resin | 20–40 |
| (b) latex sealant | 20–40 |
| (c) alkylene glycol | 2–20 |
| (d) fibers | 0.1–15 |
| (e) alkanolamine | 0.1–15 |
| (f) foaming agent | 0.1–10 |
| (g) water | balance |

The composition is applied to a punctured tire with the propellants which also act to inflate the tire. In the preferred embodiment, the composition is packaged in aerosol containers with the chlorofluorocarbon propellant or chlorofluorocarbon propellant mixture. The composition is applied to the tire through the valve stem. Once released into the interior of the tire, the composition forms a fiber containing foam. This foam acts to seal any puncture at any location on the tire. Further, the action of the foam and the propellant inflates the tire sufficiently so that the tire can support the weight of car.

DETAILED DESCRIPTION OF THE INVENTION

A tire sealant and inflator composition must have certain specific characteristics in order to be useful, even under the adverse conditions to which it will be subjected when used on a tire. In many cases, an object which punctures a tire on a highway, will remain in the tire when the sealant composition is applied. In this case, the sealant must have sufficient tack and cohesiveness to remain adhered to the object, even while the object shifts back and forth during tire use. When the puncturing object is removed from the tire, the sealant composition must be capable of flowing into the remaining hole and sealing it. Further, the seal must withstand the internal pressure of the inflated tire, as well as the pressure placed on the tire by the weight of the tire and the friction of the road when the car is moving. The sealer must be able to seal a puncture in any position on the tire when the sealant is applied through the valve stem of the tire. Also, the sealant must have inflation characteristics, and must be able to inflate a tire at substantially 0 psi to a pressure sufficient to support the weight of the car.

To provide a product which meets these requirements, the present invention provides a novel tire sealant and inflator composition contained in a container with a propellant, the composition comprising:

| Component | Wt. % - Amount |
|---|---|
| (a) a resin | 20-40 |
| (b) latex sealant | 20-40 |
| (c) alkylene glycol | 2-20 |
| (d) fibers | 0.1-15 |
| (e) alkanolamine | 0.1-15 |
| (f) foaming agent | 0.1-10 |
| (g) water | balance |

The sealant composition of this invention, when used in conjunction with a suitable propellant, is administered to a punctured tire through the tire's valve stem. The composition then forms a fiber containing foam which is capable of sealing a puncture in any location on the tire's surface. Further, the propellant, which is preferably a chlorofluorocarbon propellant or a chlorofluorocarbon propellant mixture, not only propels the composition into the tire but also inflates the sealed tire to a point sufficient to support the weight of the car.

The resin component of the novel tire sealant composition is present in an amount from about 20 to 40 wt.%. In a preferred embodiment, the resin is present in an amount from 25-30 wt.%, and most preferably at 27 wt.%. Examples of suitable resins useful in the practice of the invention include phenolic resins, such as phenolformaldehyde resins and halogenated alkyl phenol resins, and include derivatives of hydrogenated vegetable resins. The preferred resin is Foral 85-55WKX, obtained from Hercules, Inc., which is a dispersion of glycerol esters of hydrogenated wood rosins. However, any similar natural or synthetic resin or rosin may be used which is compatible with the formulation and performs the required function of the resin.

The latex sealant component is also present in an amount from about 20-40 wt.%. In a preferred embodiment, the latex sealant is present at 25-30 wt.%, and in the most preferred embodiment, at 27 wt.%. The latex used in the present invention may be any suitable polymeric or copolymeric latex, such as polymers and/or copolymers of isoprene, styrene, and butadiene. The preferred latex is a styrene/butadiene copolymer, tradename Pliolite 5356, obtained from Goodyear, as Pliolite latex which has a butadiene content greater than 50 percent. This product is a fatty acid emulsified product.

An alkylene glycol is present in the sealant composition in an amount from 2-20 wt.%. In a preferred embodiment, the alkylene glycol is present from 5-10%, and most preferably at 7.5%. Any technical grade alkylene glycol may be used in this invention. The alkylene glycol is any suitable glycol containing up to 8 carbon atoms. Ethylene glycol is the preferred freeze point depressant. The ethylene glycol acts as a freeze point depressant, and allows the sealant composition to be used at extremely low winter temperatures.

The fibers are present in the composition in an amount from about 0.1 to 1.5 wt.%, although in a preferred embodiment they are present in an amount of from 1-5 wt.%, and most preferably 2%. The fibers can be any suitable fiber which promotes clotting when the composition is applied to a puncture. Suitable fibers include, but are not limited to, inorganic fibers, such as asbestos and fiberglass, and organic fibers, such as cellulose, polypropylene, and similar natural or synthetic polymeric fibers. The preferred fibers are organic fibers and preferably cellulosic fibers, tradename Solka Flok, obtained from Grefco, Inc. The addition of the fibers to the composition speed the setting of the latex rising to the puncture of the tire, and hence speed the sealing of the puncture.

The alkanolamine component is present in an amount from about 0.1-15 wt.%. In the preferred embodiments, the alkanolamine is present in an amount of from 1-4%, and most preferably in an amount of 1.8%. The alkanolamine is preferably an alkanolamine of up to 6 carbon atoms in which the amine may contain one or two akyl substituents of up to 5 carbon atoms. The preferred alkanolamine is an ethanolamine such as N,N-dimethylethanolamine, which was obtained from Union Carbide. However, any equivalent alkanolamine may be used. The alkanolamine provides both vapor and liquid phase rust inhibition. The rust inhibiting property is important since the tire sealing liquid could remain in contact with the wheel rim for extended periods of time.

The foaming agent is present in an amount from about 0.1-10 wt.%, preferably from 0.5-2 wt.%, and most preferably at 1 wt.%. The foaming agents of this invention are fatty acid derivatives having from 10-25 carbon atoms. The preferred foaming agent is an amphoteric surfactant derived from fatty imidazolines, particularly a compound containing coconut fatty acid as the fatty acid radical, tradename Miranol $C_2M$, obtained from the Miranol Chemical Company. However, any equivalent foaming agent may be used.

The tire sealant and inflator composition of the invention is prepared by first mixing the foaming agent and alkanolamine with the water, and then adding the alkalene glycol. The fibers are added and mixed, followed by the latex and resin components. The composition is then stirred until homogeneous.

The sealant composition is packaged in sealed containers such as aerosol cans mixed with a propellant such as a chlorofluorocarbon propellant, a chlorofluorocarbon propellant mixture, or a similar propellant. The preferred chlorofluorocarbon components are dichlorodifluoromethane, tradename Freon 12, and dichlorotetrafluoroethane, tradename Freon 114, both of which may be obtained commercially from Dupont. However, other chlorofluorocarbons may be used. In addition, other propellants, such as low molecular weight hydrocarbons, e.g., gaseous alkanes, can also be used; however, in this case the non-flammable safety features of the product would be lost. In the preferred embodiments, the Freon 12 and Freon 114 are present in a 60/40 wt.% mixture. The resulting mixture will contain about 30 to 45 wt.% of sealant composition and about 70 to 55 wt.% of propellant. If a hydrocarbon propellant is used, larger amounts of hydrocarbon may be placed in the container under pressure.

An important feature of the invention is use of the fluorocarbon or hydrocarbon component as a combination propellant for the composition and inflator for the tire. Thus this component has a dual function in the composition.

The sealant mixture, contained in the aerosol container, is applied to a punctured tire through the valve stem. The container is provided with a suitable known tube and connector for activation of the valve stem. Upon release into the interior of the tire, the action of the propellant and the foaming agent causes the sealant composition to foam and to coat the interior of the tire surface. The composition then sets, thereby sealing any puncture at any location of the tire surface. The presence of the organic fibers accelerates the setting time of the resin composition in the sealer. Simultaneously, the propellant causes the tire to inflate. When the tire is inflated at ambient temperature, the internal pressure of the tire will be sufficient to support the weight of the car. However, when the tire is driven several miles, thermal expansion will cause the pressure of the tire to increase 50-100%, thereby bringing the internal tire pressure to within recommended safety standards.

The following examples are presented to illustrate the invention. However, the invention is not to be considered as limited thereto. In the Examples and throughout the specification, parts are by weight unless otherwise indicated.

EXAMPLE 1

A tire sealant and inflator composition of the following formula was prepared.

| Component | Wt. % - Amount |
|---|---|
| Distilled or deionized water | 33.7 |
| Miranol C$_2$M anhydrous acid | 1.0 |
| N.N—dimethylethanolamine | 1.8 |
| Ethylene Glycol | 7.5 |
| Solka Flok Fibers | 2.0 |
| Foral 85-55WKX rosin | 27.0 |
| Pliolite SBR Latex | 27.0 |

In forming the composition, the N,N-dimethylethanolamine and the Miranol C$_2$M were dissolved in the water. After the Miranol dissolved, ethylene glycol was added and mixed until homogeneous. While stirring, the Solka Flok was added and mixed until well dispersed. The Pliolite latex was then added followed by the Floral resin, and the composition was stirred until a uniform, homogenously dispersed product was obtained.

EXAMPLE 2

The product of Example 1 was filled into a 20 ounce net weight fill aerosol can with a 50/50 wt.% blend of Freon 12 and Freon 114 as inflator/propellant. An Eldorado Supreme G78-14 tire was punctured with a 5/32 inch nail, 180° opposite the valve stem. This is considered to be the most difficult position to repair because of the distance the foaming sealer must travel from the valve before reaching its destination at the point of puncture. The tire had deflated to approximately 0 psi without breaking the bead of the tire. The tire was placed in a position with the valve stem at 6 o'clock and the puncture at 12 o'clock, and the sample was applied to the valve stem. The entire contents of the can were released into the interior of the tire. The pressure at this point was checked and found to be 11 psi. A slow leak was detected when soapy water was poured on the tire. The tire was then driven for approximately three miles and the tire was checked again. Pressure had increased to 22 psi and no leak could be detected. The increase in pressure was due to thermal expansion. The tire held the pressure during several weeks of subsequent observation.

EXAMPLE 3

A 16 ounce net weight fill aerosol can containing the product of Example 1 with the 50/50 Freon 12, Freon 114 mixture as a propellant was prepared. The can was tested on a Gillette "Golden Bear" polyester/fiberfill G78-14 size tire. Experimental conditions were the same as in Example 2, except the tire was allowed to deflate to 6 psi. This represents a characteristic pressure loss upon the occurrence of a flat tire. The tire was inflated with the 16 ounce can, and a pressure of 14 psi was recorded immediately thereafter. The tire was then driven for three miles, and a pressure of 21 psi was recorded. No leaks were detected after the three mile drive, and the tire held pressure during subsequent observation.

EXAMPLE 4

In order to achieve higher initial inflation pressures, the product of Example 1 was packaged into 20 ounce net weight aerosol cans with a 60/40 blend of Freon 12 and Freon 114. The product of Example 1 was packaged at a weight percent of 35%, with the Freon propellant at 65%. The 20 ounch can was used to inflate a punctured B. F. Goodrich "Lifesaver XLM" steel belted tire. The test conditions were the same as in Examples 2 and 3. Immediately after inflation, a pressure of 18 psi was observed. After being driven the three mile distance, the tire pressure had increased to 27 psi.

To determine whether a further significant rise in pressure would take place when the tire was subjected to a lengthy drive and subsequent rise in temperature, the tire was warmed in an oven to 128° F. for a period of five hours. The pressure increased approximately 5 psi, which was not considered to be an excessive rise in pressure.

EXAMPLE 5

A one pound net weight aerosol can was prepared with the product of Example 1 and the 60/40 Freon 12/114 propellant mixture. The one pound can was used to inflate a B. F. Goodrich steel belted radial P175/75R14 tire, which had been allowed to deflate to 6 psi after being punctured. Immediately after inflation, a pressure of 20 psi was obtained. After being driven three miles, the pressure of the tire rose to 30 psi. Upon standing at a temperature of approximately 60° F., the tire registered a pressure of 25 psi. When warmed in an oven at 128° F. for approximately five hours, the pressure of the tire again rose to 30 psi. The pressure loss is believed to be due to frequent testing with a gauge, since there was no leak detectable at the original point of puncture. Again, the rise of 5 psi when the tire was warmed in the oven for five hours is not considered to be an excessive rise in pressure.

The invention has been described herein with reference to certain embodiments. However, as obvious variations thereon will become apparent to those skilled in the art, the invention is not considered to be limited thereto.

We claim:
1. A tire sealant and inflator composition comprising:
   (a) 20-40 wt.% of a resin
   (b) 20-40 wt.% of a latex sealant
   (c) 2-20 wt.% of an alkylene glycol
   (d) 0.1-15 wt.% of fibers
   (e) 0.1-15 wt.% alkanolamine
   (f) 0.1-10 wt.% of a foaming agent
   (g) balance, water,
said composition being contained in admixture with a propellant/inflator.

2. A composition according to claim 1 wherein the resin is present in an amount from about 25-30 wt.%.

3. A composition according to claim 1 wherein the resin is a glycerol ester dispersion of a hydrogenated wood rosin.

4. A composition according to claim 1 wherein the latex sealant is present in an amount from about 25-30 wt.%.

5. A composition according to claim 1 wherein the latex is a styrene/butadiene copolymer latex.

6. A composition according to claim 1 wherein the alkylene glycol is ethylene glycol and is present in an amount from about 5-10 wt.%.

7. A composition according to claim 1 wherein the organic fibers are present in an amount from about 1-5 wt.%.

8. A composition according to claim 1 wherein the fibers are cellulosic fibers.

9. A composition according to claim 1 wherein the ethanolamine is present in an amount of from about 1-5 wt.%.

10. A composition according to claim 1 wherein the alkanolamine component is N,N-dimethylethanolamine.

11. A composition according to claim 1 wherein the foaming agent is present in an amount of from about 0.1-3%.

12. A composition according to claim 1 wherein the foaming agent is an amphoteric surfactant derived from coconut fatty acid imidazolines.

13. The composition of claim 1 wherein the composition is packaged in an aerosol container with the propellant/inflator.

14. A composition according to claim 13 wherein the propellant/inflator is a chlorofluorocarbon selected from the group consisting of dichlorodifluoromethane and dichlorotetrafluoroethane, or mixtures thereof.

15. A composition according to claim 14 wherein the chlorofluorocarbon is present in a ratio of 60 wt.% dichlorodifluoromethane and 40 wt.% dichlorotetrafluoroethane.

16. A tire sealant and inflator composition comprising:

(a) 27 wt.% of glycerol esters of hydrogenated wood rosins
(b) 27 wt.% of a styrene/butadiene copolymer latex sealant
(c) 7.5 wt.% of ethylene glycol
(d) 20 wt.% of cellulose fibers
(e) 1.8 wt.% N,N-dimethyl-ethanolamine
(f) 1.0 wt.% of an amphoteric imidazoline surfactant derived from coconut fatty acids
(g) 33.7 wt.% water, said composition being contained in admixture with at least one chlorofluorocarbon.

17. As an article of manufacture, an aerosol container containing the following sealant composition:

(a) 20-40 wt.% of a resin
(b) 20-40 wt.% of a latex sealant
(c) 2-20 wt.% of an alkylene glycol
(d) 1-15 wt.% of fibers
(e) 0.1-15 wt.% alkanolamine
(f) 0.1-10 wt.% of a foaming agent
(g) balance, water in admixture with a propellant/inflator.

18. An article of manufacture according to claim 17 wherein the container contains about 30 to 45 wt.% of the sealant composition and about 70 to 55 wt.% of propellant/inflator.

19. An article of manufacture according to claim 18 wherein the propellant/inflator is a chlorofluorocarbon or mixture thereof.

20. As an article of manufacture, an aerosol container which contains the following composition:

(a) 27 wt.% of glycerol esters of hydrogenated wood resons
(b) 27 wt.% of a styrene/butadiene copolymer latex sealant
(c) 7.5 wt.% of ethylene glycol
(d) 2.0 wt.% of cellulose fibers
(e) 1.8 wt.% N,N-dimethyl-ethanolamine
(f) 1.0 wt.% of an amphoteric imidazoline surfactant derived from coconut fatty acids
(g) 33.7 wt.% water, said composition being in admixture with a chlorofluorocarbon component as a propellant/inflator component.

* * * * *

UNITED STATES PATENT AND TRADEMARK OFFICE
CERTIFICATE OF CORRECTION

PATENT NO. : 4,501,825
DATED : February 26, 1985
INVENTOR(S) : Arpad M. MAGYAR and Gerald G. SMITH It is certified that error appears in the above-identified patent and that said Letters Patent is hereby corrected as shown below:

Col. 3, Line 63, change "1.5 wt%" to --15 wt%--

Col. 4, Line 6, change "speed" to --speeds--

Col. 4, Line 7, change "speed" to --speeds--

Col. 4, Line 36/37, change "alkalene" to --alkylene--

Col. 6, Line 20, change "ounch" to --ounce--

Signed and Sealed this

Thirteenth Day of August 1985

[SEAL]

*Attest:*

DONALD J. QUIGG

*Attesting Officer*     *Acting Commissioner of Patents and Trademarks*